United States Patent
Melanson

(10) Patent No.: US 8,279,628 B2
(45) Date of Patent: Oct. 2, 2012

(54) AUDIBLE NOISE SUPPRESSION IN A RESONANT SWITCHING POWER CONVERTER

(75) Inventor: John L. Melanson, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 982 days.

(21) Appl. No.: 12/241,969

(22) Filed: Sep. 30, 2008

(65) Prior Publication Data

US 2010/0020573 A1 Jan. 28, 2010

Related U.S. Application Data

(60) Provisional application No. 61/083,717, filed on Jul. 25, 2008.

(51) Int. Cl.
*H02M 3/335* (2006.01)
(52) U.S. Cl. ............... 363/17; 363/18; 363/21.02
(58) Field of Classification Search ............... 363/17, 363/18, 19, 21.02, 21.1, 21.11, 21.18, 21.41, 363/21.14
See application file for complete search history.

(56) References Cited

U.S. PATENT DOCUMENTS

| | | | |
|---|---|---|---|
| 3,316,495 A | 4/1967 | Sherer | |
| 3,423,689 A | 1/1969 | Miller et al. | |
| 3,586,988 A | 6/1971 | Weekes | |
| 3,725,804 A | 4/1973 | Langan | |
| 3,790,878 A | 2/1974 | Brokaw | |
| 3,881,167 A | 4/1975 | Pelton et al. | |
| 4,075,701 A | 2/1978 | Hofmann | |
| 4,334,250 A | 6/1982 | Theus | |
| 4,409,476 A | 10/1983 | Lofgren et al. | |
| 4,414,493 A | 11/1983 | Henrich | |
| 4,476,706 A | 10/1984 | Hadden et al. | |
| 4,523,128 A | 6/1985 | Stamm | |
| 4,677,366 A | 6/1987 | Wilkinson et al. | |
| 4,683,529 A | 7/1987 | Bucher | |

(Continued)

FOREIGN PATENT DOCUMENTS

DE 19713814 10/1998

(Continued)

OTHER PUBLICATIONS

Mamano, Bob, "Current Sensing Solutions for Power Supply Designers", Unitrode Seminar Notes SEM1200, 1999.

(Continued)

*Primary Examiner* — Nguyen Tran
(74) *Attorney, Agent, or Firm* — Mitch Harris, Atty at Law, LLC; Andrew M. Harris

(57) ABSTRACT

Audible noise in resonant switching power converter during low-power burst mode operation is reduced by spreading the spectrum generated by the bursts, thereby reducing the amplitude of audio spectrum peaks in the current supplied through the resonant tank from a switching circuit. The spreading can be accomplished by varying the intervals between the bursts and/or by varying a pulse pattern within the bursts. The pulse pattern within the bursts can be varied by varying the number of pulses in the bursts, the polarity of the initial pulse of the bursts, and/or the duration of pulses within the bursts either uniformly or randomly. The burst pulse pattern may also be selected in alternation from a set of pulse patterns stored in a memory and the selection may be made randomly or systematically.

21 Claims, 5 Drawing Sheets

U.S. PATENT DOCUMENTS

| | | |
|---|---|---|
| 4,697,210 A | 9/1987 | Toyota et al. |
| 4,700,188 A | 10/1987 | James |
| 4,737,658 A | 4/1988 | Kronmuller et al. |
| 4,797,633 A | 1/1989 | Humphrey |
| 4,937,728 A | 6/1990 | Leonardi |
| 4,940,929 A | 7/1990 | Williams |
| 4,973,919 A | 11/1990 | Allfather |
| 4,979,087 A | 12/1990 | Sellwood et al. |
| 4,980,898 A | 12/1990 | Silvian |
| 4,992,919 A | 2/1991 | Lee et al. |
| 4,994,952 A | 2/1991 | Silva et al. |
| 5,001,620 A | 3/1991 | Smith |
| 5,055,746 A | 10/1991 | Hu et al. |
| 5,109,185 A | 4/1992 | Ball |
| 5,121,079 A | 6/1992 | Dargatz |
| 5,206,540 A | 4/1993 | de Sa e Silva et al. |
| 5,264,780 A | 11/1993 | Bruer et al. |
| 5,278,490 A | 1/1994 | Smedley |
| 5,323,157 A | 6/1994 | Ledzius et al. |
| 5,359,180 A | 10/1994 | Park et al. |
| 5,383,109 A | 1/1995 | Maksimovic et al. |
| 5,424,932 A | 6/1995 | Inou et al. |
| 5,477,481 A | 12/1995 | Kerth |
| 5,479,333 A | 12/1995 | McCambridge et al. |
| 5,481,178 A | 1/1996 | Wilcox et al. |
| 5,565,761 A | 10/1996 | Hwang |
| 5,589,759 A | 12/1996 | Borgato et al. |
| 5,638,265 A | 6/1997 | Gabor |
| 5,691,890 A | 11/1997 | Hyde |
| 5,747,977 A | 5/1998 | Hwang |
| 5,757,635 A | 5/1998 | Seong |
| 5,764,039 A | 6/1998 | Choi et al. |
| 5,768,111 A | 6/1998 | Zaitsu |
| 5,781,040 A | 7/1998 | Myers |
| 5,783,909 A | 7/1998 | Hochstein |
| 5,798,635 A | 8/1998 | Hwang et al. |
| 5,834,858 A | 11/1998 | Crosman, III et al. |
| 5,900,683 A | 5/1999 | Rinehart et al. |
| 5,912,812 A | 6/1999 | Moriarty, Jr. |
| 5,929,400 A | 7/1999 | Colby et al. |
| 5,946,202 A | 8/1999 | Balogh |
| 5,946,206 A | 8/1999 | Shimizu et al. |
| 5,952,849 A | 9/1999 | Haigh et al. |
| 5,960,207 A | 9/1999 | Brown |
| 5,962,989 A | 10/1999 | Baker |
| 5,963,086 A | 10/1999 | Hall |
| 5,966,297 A | 10/1999 | Minegishi |
| 5,994,885 A | 11/1999 | Wilcox et al. |
| 6,016,038 A | 1/2000 | Mueller et al. |
| 6,043,633 A | 3/2000 | Lev et al. |
| 6,072,969 A | 6/2000 | Yokomori et al. |
| 6,083,276 A | 7/2000 | Davidson et al. |
| 6,084,450 A | 7/2000 | Smith et al. |
| 6,091,233 A | 7/2000 | Hwang et al. |
| 6,125,046 A | 9/2000 | Jang et al. |
| 6,150,774 A | 11/2000 | Mueller et al. |
| 6,181,114 B1 | 1/2001 | Hemena et al. |
| 6,211,626 B1 | 4/2001 | Lys et al. |
| 6,211,627 B1 | 4/2001 | Callahan |
| 6,229,271 B1 | 5/2001 | Liu |
| 6,229,292 B1 | 5/2001 | Redl et al. |
| 6,246,183 B1 | 6/2001 | Buonavita |
| 6,259,614 B1 | 7/2001 | Ribarich et al. |
| 6,300,723 B1 | 10/2001 | Wang et al. |
| 6,304,066 B1 | 10/2001 | Wilcox et al. |
| 6,304,473 B1 | 10/2001 | Telefus et al. |
| 6,343,026 B1 | 1/2002 | Perry |
| 6,344,811 B1 | 2/2002 | Melanson |
| 6,369,525 B1 | 4/2002 | Chang et al. |
| 6,385,063 B1 | 5/2002 | Sadek et al. |
| 6,407,514 B1 | 6/2002 | Glaser et al. |
| 6,407,515 B1 | 6/2002 | Hesler |
| 6,407,691 B1 | 6/2002 | Yu |
| 6,441,558 B1 | 8/2002 | Muthu et al. |
| 6,445,600 B2 | 9/2002 | Ben-Yaakov |
| 6,452,521 B1 | 9/2002 | Wang |
| 6,469,484 B2 | 10/2002 | L'Hermite et al. |
| 6,496,586 B1 | 12/2002 | Hayes et al. |
| 6,509,913 B2 | 1/2003 | Martin, Jr. et al. |
| 6,531,854 B2 | 3/2003 | Hwang |
| 6,580,258 B2 | 6/2003 | Wilcox et al. |
| 6,583,550 B2 | 6/2003 | Iwasa et al. |
| 6,628,106 B1 | 9/2003 | Batarseh et al. |
| 6,636,003 B2 | 10/2003 | Rahm et al. |
| 6,646,848 B2 | 11/2003 | Yoshida et al. |
| 6,657,417 B1 | 12/2003 | Hwang |
| 6,688,753 B2 | 2/2004 | Calon et al. |
| 6,713,974 B2 | 3/2004 | Patchornik et al. |
| 6,724,174 B1 | 4/2004 | Esteves et al. |
| 6,727,832 B1 | 4/2004 | Melanson |
| 6,737,845 B2 | 5/2004 | Hwang |
| 6,741,123 B1 | 5/2004 | Anderson et al. |
| 6,753,661 B2 | 6/2004 | Muthu et al. |
| 6,768,655 B1 | 7/2004 | Yang et al. |
| 6,781,351 B2 | 8/2004 | Mednik et al. |
| 6,788,011 B2 | 9/2004 | Mueller et al. |
| 6,806,659 B1 | 10/2004 | Mueller et al. |
| 6,839,247 B1 | 1/2005 | Yang et al. |
| 6,860,628 B2 | 3/2005 | Robertson et al. |
| 6,870,325 B2 | 3/2005 | Bushell et al. |
| 6,873,065 B2 | 3/2005 | Haigh et al. |
| 6,882,552 B2 | 4/2005 | Telefus et al. |
| 6,888,322 B2 | 5/2005 | Dowling et al. |
| 6,894,471 B2 | 5/2005 | Corva et al. |
| 6,933,706 B2 | 8/2005 | Shih |
| 6,940,733 B2 | 9/2005 | Schie et al. |
| 6,944,034 B1 | 9/2005 | Shteynberg et al. |
| 6,956,750 B1 | 10/2005 | Eason et al. |
| 6,958,920 B2 | 10/2005 | Mednik et al. |
| 6,967,448 B2 | 11/2005 | Morgan et al. |
| 6,970,503 B1 | 11/2005 | Kalb |
| 6,975,079 B2 | 12/2005 | Lys et al. |
| 6,975,523 B2 | 12/2005 | Kim et al. |
| 6,980,446 B2 | 12/2005 | Simada et al. |
| 7,003,023 B2 | 2/2006 | Krone et al. |
| 7,034,611 B2 | 4/2006 | Oswal et al. |
| 7,050,509 B2 | 5/2006 | Krone et al. |
| 7,064,498 B2 | 6/2006 | Dowling et al. |
| 7,064,531 B1 | 6/2006 | Zinn |
| 7,072,191 B2 | 7/2006 | Nakao et al. |
| 7,075,329 B2 | 7/2006 | Chen et al. |
| 7,078,963 B1 | 7/2006 | Andersen et al. |
| 7,088,059 B2 | 8/2006 | McKinney et al. |
| 7,099,163 B1 | 8/2006 | Ying |
| 7,102,902 B1 | 9/2006 | Brown et al. |
| 7,106,603 B1 | 9/2006 | Lin et al. |
| 7,109,791 B1 | 9/2006 | Epperson et al. |
| 7,126,288 B2 | 10/2006 | Ribarich et al. |
| 7,135,824 B2 | 11/2006 | Lys et al. |
| 7,145,295 B1 | 12/2006 | Lee et al. |
| 7,158,573 B2 | 1/2007 | Hershbarger |
| 7,158,633 B1 | 1/2007 | Hein |
| 7,161,816 B2 | 1/2007 | Shteynberg et al. |
| 7,180,250 B1 | 2/2007 | Gannon |
| 7,183,957 B1 | 2/2007 | Melanson |
| 7,212,640 B2 | 5/2007 | Bizjak |
| 7,221,130 B2 | 5/2007 | Ribeiro et al. |
| 7,233,135 B2 | 6/2007 | Noma et al. |
| 7,246,919 B2 | 7/2007 | Porchia et al. |
| 7,255,457 B2 | 8/2007 | Ducharme et al. |
| 7,266,001 B1 | 9/2007 | Notohamiprodjo et al. |
| 7,272,585 B2 | 9/2007 | Nomura et al. |
| 7,276,861 B1 | 10/2007 | Shteynberg et al. |
| 7,288,902 B1 | 10/2007 | Melanson |
| 7,289,054 B1 | 10/2007 | Watanabe |
| 7,292,013 B1 | 11/2007 | Chen et al. |
| 7,310,244 B2 | 12/2007 | Yang et al. |
| 7,331,226 B2 | 2/2008 | Feldman et al. |
| 7,345,458 B2 | 3/2008 | Kanai et al. |
| 7,375,476 B2 | 5/2008 | Walter et al. |
| 7,382,635 B2 | 6/2008 | Noda |
| 7,394,210 B2 | 7/2008 | Ashdown |
| 7,511,437 B2 | 3/2009 | Lys et al. |
| 7,538,499 B2 | 5/2009 | Ashdown |
| 7,545,130 B2 | 6/2009 | Latham |
| 7,554,473 B2 | 6/2009 | Melanson |
| 7,569,996 B2 | 8/2009 | Holmes et al. |

| | | |
|---|---|---|
| 7,583,136 B2 | 9/2009 | Pelly |
| 7,656,103 B2 | 2/2010 | Shteynberg et al. |
| 7,667,986 B2 | 2/2010 | Artusi et al. |
| 7,710,047 B2 | 5/2010 | Shteynberg et al. |
| 7,719,246 B2 | 5/2010 | Melanson |
| 7,719,248 B1 | 5/2010 | Melanson |
| 7,733,669 B2 * | 6/2010 | Jiao et al. ............ 363/16 |
| 7,746,043 B2 | 6/2010 | Melanson |
| 7,746,671 B2 | 6/2010 | Radecker et al. |
| 7,750,738 B2 | 7/2010 | Bach |
| 7,756,896 B1 | 7/2010 | Feingold |
| 7,777,563 B2 | 8/2010 | Midya et al. |
| 7,804,256 B2 | 9/2010 | Melanson |
| 7,804,480 B2 | 9/2010 | Jeon et al. |
| 2002/0065583 A1 | 5/2002 | Okada |
| 2002/0145041 A1 | 10/2002 | Muthu et al. |
| 2002/0150151 A1 | 10/2002 | Krone et al. |
| 2002/0166073 A1 | 11/2002 | Nguyen et al. |
| 2003/0090252 A1 * | 5/2003 | Hazucha ............ 323/282 |
| 2003/0095013 A1 | 5/2003 | Melanson et al. |
| 2003/0174520 A1 | 9/2003 | Bimbaud |
| 2003/0214821 A1 * | 11/2003 | Giannopoulos et al. ... 363/21.02 |
| 2003/0223255 A1 | 12/2003 | Ben-Yaakov |
| 2004/0004465 A1 | 1/2004 | McGinnis |
| 2004/0046683 A1 | 3/2004 | Mitamura et al. |
| 2004/0085030 A1 | 5/2004 | Laflamme et al. |
| 2004/0085117 A1 | 5/2004 | Melbert et al. |
| 2004/0169477 A1 | 9/2004 | Yancie et al. |
| 2004/0227571 A1 | 11/2004 | Kuribayashi |
| 2004/0228116 A1 | 11/2004 | Miller et al. |
| 2004/0232971 A1 | 11/2004 | Kawasaki et al. |
| 2004/0239262 A1 | 12/2004 | Ido et al. |
| 2005/0057237 A1 | 3/2005 | Clavel |
| 2005/0156770 A1 | 7/2005 | Melanson |
| 2005/0168492 A1 | 8/2005 | Hekstra et al. |
| 2005/0184895 A1 | 8/2005 | Petersen et al. |
| 2005/0197952 A1 | 9/2005 | Shea et al. |
| 2005/0207190 A1 | 9/2005 | Gritter |
| 2005/0222881 A1 | 10/2005 | Booker |
| 2005/0253533 A1 | 11/2005 | Lys et al. |
| 2005/0270813 A1 | 12/2005 | Zhang et al. |
| 2005/0275354 A1 | 12/2005 | Hausman, Jr. et al. |
| 2005/0275386 A1 | 12/2005 | Jepsen et al. |
| 2006/0002110 A1 | 1/2006 | Dowling |
| 2006/0022916 A1 | 2/2006 | Aiello |
| 2006/0023002 A1 | 2/2006 | Hara et al. |
| 2006/0116898 A1 | 6/2006 | Peterson |
| 2006/0125420 A1 | 6/2006 | Boone et al. |
| 2006/0184414 A1 | 8/2006 | Pappas et al. |
| 2006/0214603 A1 | 9/2006 | Oh et al. |
| 2006/0226795 A1 | 10/2006 | Walter et al. |
| 2006/0238136 A1 | 10/2006 | Johnson, III et al. |
| 2006/0261754 A1 | 11/2006 | Lee |
| 2006/0285365 A1 | 12/2006 | Huynh et al. |
| 2007/0024213 A1 | 2/2007 | Shteynberg et al. |
| 2007/0029946 A1 | 2/2007 | Yu et al. |
| 2007/0040512 A1 | 2/2007 | Jungwirth et al. |
| 2007/0053182 A1 | 3/2007 | Robertson |
| 2007/0055564 A1 | 3/2007 | Fourman |
| 2007/0103949 A1 | 5/2007 | Tsuruya |
| 2007/0124615 A1 | 5/2007 | Orr |
| 2007/0126656 A1 | 6/2007 | Huang et al. |
| 2007/0182699 A1 | 8/2007 | Ha et al. |
| 2007/0231009 A1 | 10/2007 | Watahiki |
| 2007/0285031 A1 | 12/2007 | Shteynberg et al. |
| 2008/0012502 A1 | 1/2008 | Lys |
| 2008/0027841 A1 | 1/2008 | Eder |
| 2008/0043504 A1 | 2/2008 | Ye et al. |
| 2008/0054815 A1 | 3/2008 | Kotikalapoodi et al. |
| 2008/0116818 A1 | 5/2008 | Shteynberg et al. |
| 2008/0130322 A1 | 6/2008 | Artusi et al. |
| 2008/0130336 A1 | 6/2008 | Taguchi |
| 2008/0150433 A1 | 6/2008 | Tsuchida et al. |
| 2008/0154679 A1 | 6/2008 | Wade |
| 2008/0174291 A1 | 7/2008 | Hansson et al. |
| 2008/0174372 A1 | 7/2008 | Tucker et al. |
| 2008/0175029 A1 | 7/2008 | Jung et al. |
| 2008/0192509 A1 | 8/2008 | Dhuyvetter et al. |
| 2008/0224635 A1 | 9/2008 | Hayes |
| 2008/0232141 A1 | 9/2008 | Artusi et al. |
| 2008/0239764 A1 | 10/2008 | Jacques et al. |
| 2008/0259655 A1 | 10/2008 | Wei et al. |
| 2008/0278132 A1 | 11/2008 | Kesterson et al. |
| 2008/0310194 A1 * | 12/2008 | Huang et al. ............ 363/21.18 |
| 2009/0067204 A1 | 3/2009 | Ye et al. |
| 2009/0070188 A1 | 3/2009 | Scott et al. |
| 2009/0174479 A1 | 7/2009 | Yan et al. |
| 2009/0190384 A1 | 7/2009 | Thompson |
| 2009/0191837 A1 | 7/2009 | Nanda et al. |
| 2009/0218960 A1 | 9/2009 | Lyons et al. |
| 2010/0020569 A1 | 1/2010 | Melanson et al. |
| 2010/0020570 A1 | 1/2010 | Melanson et al. |
| 2010/0141317 A1 | 6/2010 | Szajnowski |

FOREIGN PATENT DOCUMENTS

| | | |
|---|---|---|
| EP | 0632679 | 1/1995 |
| EP | 0838791 | 4/1998 |
| EP | 1014563 | 6/2000 |
| EP | 1164819 | 12/2001 |
| EP | 1213823 | 6/2002 |
| EP | 1460775 | 9/2004 |
| EP | 1528785 | 5/2005 |
| EP | 1768257 A1 | 3/2007 |
| EP | 2204905 A1 | 7/2010 |
| GB | 2069269 | 8/1981 |
| GB | 2262673 A | 6/1993 |
| WO | WO 91/13417 | 9/1991 |
| WO | W09725836 | 7/1997 |
| WO | WO 97/42714 | 11/1997 |
| WO | WO 01/15316 | 1/2001 |
| WO | WO 01/84697 | 11/2001 |
| WO | WO 01/97384 | 12/2001 |
| WO | WO 02/15386 | 2/2002 |
| WO | WO 02/27944 | 4/2002 |
| WO | WO 02/091805 | 11/2002 |
| WO | W02006013557 | 2/2006 |
| WO | WO 2006/067521 | 6/2006 |
| WO | WO 2006/135584 | 12/2006 |
| WO | WO 2007/026170 | 3/2007 |
| WO | WO 2007/079362 | 7/2007 |
| WO | W02008072160 | 6/2008 |
| WO | W02008152838 | 12/2008 |

OTHER PUBLICATIONS

Texas Instruments, Interleaving Continuous Conduction Mode PFC Controller, UCC28070, SLUS794C, Nov. 2007, revised Jun. 2009, Texas Instruments, Dallas TX.

Maksimovic, et al., "Impact of Digital Control in Power Electronics", Proceedings of the 2004 International Symposium on Power Semiconductor Devices & ICs, pp. 13-22, Kitakyushu, JP, 2004.

L6562 Datasheet, "Transition-Mode PFC Controller", ST Microelectronics, Nov. 2005, Geneva, Switzerland.

http://toolbarpdf.com/docs/functions-and-features-of-inverters.html printed on Jan. 20, 2011.

Lin et al., "Robust Controller Design for a Series Resonant Converter via Duty-Cycle Control", IEEE Transactions on Power Electronics, Sep. 1999, p. 793-802, vol. 14 No. 5.

Laouamri et al., "Modeling and Analysis of Wound Integrated LCT Structure for Single Stage Resonant PFC Rectifier", IEEE Transactions on Power Electronics, Jan. 2003, p. 256-269, vol. 18, No. 1.

Hattrup et al., "Fast Estimation Techniques for Digital Control of Resonant Converters", IEEE Transactions on Power Electronics, Jan. 2003, p. 365-372, vol. 18, No. 1.

Foster et al., "Cyclic-Averaging for High Speed Analysis of Resonant Converters", IEEE Transactions on Power Electronics, Jul. 2003, p. 985-993, vol. 18, No. 4.

Mangat et al., "A Modified Asymmetrical Pulse-Width-Modulated Resonant DC/DC Converter Topology", IEEE Transactions on Power Electronics, Jan. 2004, p. 104-111, vol. 19, No. 1.

Tuomainen et al., "Effect of Resonant Transition on Efficiency of Forward Converter with Active Clamp and Self-Driven SRs", IEEE Transactions on Power Electronics, Mar. 2005, p. 315-323, vol. 20, No. 2.

Lilei Gu et al., "Three-Level LLC Series Resonant DC/DC Converter", IEEE Transactions on Power Electronics, Jul. 2005, p. 781-789, vol. 20, No. 4.

Barragan et al., "Efficiency Optimization in ZVS Series Resonant Inverters With Asymmetrical Voltage-Cancellation Control", IEEE Transactions on Power Electronics, Sep. 2005, p. 1036-1044, vol. 20, No. 5.

Chen et al., "Generalized Optimal Trajectory Control for Closed Loop Control of Series-Parallel Resonant Converter", IEEE Transactions on Power Electronics, Sep. 2006, p. 1347-1355, vol. 21, No. 5.

Xie et al., "Analysis and Optimization of LLC Resonant Converter With a Novel Over-Current Protection Circuit", IEEE Transactions on Power Electronics, Mar. 2007, p. 435-443, vol. 22 No. 2.

Bhat et al., "Analysis and Design of a High-Frequency Resonant Converter Using LCC-Type Commutation", IEEE Transactions on Power Electronics, Oct. 1987, p. 291-301, vol. PE-2 No. 4.

De Groot et al., "Design of a 1-MHz LLC Resonant Converter Based on a DSP-Driven SOI Half-Bridge Power MOS Module", IEEE Transactions on Power Electronics, Nov. 2007, p. 2307-2320, vol. 22 No. 4.

Abramovitz et al., "A Resonant DC-DC Transformer With Zero Current Ripple", IEEE Transactions on Power Electronics, Nov. 2007, p. 2344-2351, vol. 22, No. 6.

Ye et al., "A Robust One-Cycle Controlled Full-Bridge Series-Parallel Resonant Inverter for a High Frequency AC (HFAC) Distribution System", IEEE Transactions on Power Electronics, Nov. 2007, p. 2331-2343, vol. 22, No. 6.

Yan Lu et al., "Quasi Current Mode Control for the Phase-Shifting Series Resonant Converter", IEEE Transactions on Power Electronics, Jan. 2008, p. 353-358, vol. 23 No. 1.

Texas Instruments BiCMOS Advanced Phase-Shift PWM Controller Datasheet, Dec. 1999, Rev. Apr. 2008.

"AN-H52 Application Note: HV9931 Unity Power Factor LED Lamp Driver" Mar. 7, 2007, Supertex Inc., Sunnyvale, CA, USA.

"HV9931 Unity Power Factor LED Lamp Driver, Initial Release", Supertex Inc., Sunnyvale, CA USA 2005.

A. Prodic, Compensator Design and Stability Assessment for Fast Voltage Loops of Power Factor Correction Rectifiers, IEEE Transactions on Power Electronics, vol. 22, No. 5, Sep. 2007.

A. R. Seidel et al., A Practical Comparison Among High-Power-Factor Electronic Ballasts with Similar Ideas, IEEE Transactions on Industry Applications, vol. 41, No. 6, Nov.-Dec. 2005.

A. Silva De Morais et al., A High Power Factor Ballast Using a Single Switch with Both Power Stages Integrated, IEEE Transactions on Power Electronics, vol. 21, No. 2, Mar. 2006.

AD7400 Datasheet, "Isolated Sigma-Delta Modulator", Analog Devices 2006.

Allegro Microsystems, A1442, "Low Voltage Full Bridge Brushless DC Motor Driver with Hall Commutation and Soft-Switching, and Reverse Battery, Short Circuit, and Thermal Shutdown Protection," Worcester MA, 2009.

Analog Devices, "120 kHz Bandwidth, Low Distortion, Isolation Amplifier", AD215, Norwood, MA, 1996.

Analog Devices, "Isolated Sigma-Delta Modulator", AD7400, Analog Devices, Norwood, MA, 2006.

AZOTEQ, IQS17 Family, IQ Switch®—ProxSense™ Series, Touch Sensor, Load Control and User Interface, IQS17 Datasheet V2.00. doc, Jan. 2007.

B.A. Miwa et al., High Efficiency Power Factor Correction Using Interleaved Techniques, Applied Power Electronics Conference and Exposition, Seventh Annual Conference Proceedings, Feb. 23-27, 1992.

BB3656 Datasheet "Transformer Coupled Isolation Amplifier", Burr-Brown 1987.

Ben-Yaakov et al, "The Dynamics of a PWM Boost Converter with Resistive Input" IEEE Transactions on Industrial Electronics, IEEE Service Center, Piscataway, NJ, USA, vol. 46, No. 3, Jun. 1, 1999.

Burr_Brown, "Transformer Coupled Isolation Amplifier", BB3656 Datasheet, Tucson, AZ, 1987.

Burr-Brown, ISO120 and ISO121, "Precision Los Cost Isolation Amplifier," Tucson AZ, Mar. 1992.

Burr-Brown, ISO130, "High IMR, Low Cost Isolation Amplifier," SBOS220, US, Oct. 2001.

C. Dilouie, Introducing the LED Driver, EC&M, Sep. 2004.

C. M. De Oliviera Stein et al., a ZCT Auxiliary Communication Circuit for Interleaved Boost Converters Operating in Critical Conduction Mode, IEEE Transactions on Power Electronics, vol. 17, No. 6, Nov. 2002.

Chromacity Shifts in High-Power White LED Systems due to Different Dimming Methods, Solid-State Lighting, http://www.lrc.rpi.edu/programs/solidstate/completedProjects.asp?ID=76, printed May 3, 2007.

Color Temperature, www.sizes.com/units/color_temperature.htm, printed Mar. 27, 2007.

D. Hausman, Real-Time Illumination Stability Systems for Trailing-Edge (Reverse Phase Control) Dimmers, Technical White Paper, Lutron, version 1.0, Dec. 2004, http://www.lutron.com/technical_info/pdf/RTISS-TE.pdf.

D. Maksimovic et al., "Switching Converters with Wide DC Conversion Range," Institute of Electrical and Electronic Engineers (IEEE) Transactions on Power Electronics, Jan. 1991.

D. Rand et al., Issues, Models and Solutions for Triac Modulated Phase Dimming of LED Lamps, Power Electronics Specialists Conference, 2007.

D.K.W. Cheng et al., A New Improved Boost Converter with Ripple Free Input Current Using Coupled Inductors, Power Electronics and Variable Speed Drives, Sep. 21-23, 1998.

Dallas Semiconductor, Maxim, "Charge-Pump and Step-Up DC-DC Converter Solutions for Powering White LEDs in Series or Parallel Connections," Apr. 23, 2002.

Data Sheet LT3496 Triple Output LED Driver, Linear Technology Corporation, Milpitas, CA 2007.

Doyle et al., Feedback Control Theory, Macmillan Publishing Co., 1990.

Dunn, Jamie, "Determining MOSFET Driver Needs for Motor Drive Applications," AN898 Application Note, Microchip Technology, Chandler, AZ, 2003.

Dustin Rand et al: "Issues, Models and Solutions for Triac Modulated Phase Dimming of LED Lamps" Power Electronics Specialists Conferrence, 2007. PESC 2007. IEEE, IEEE, P1, Jun. 1, 2007, pp. 1398-1404.

Erickson, Robert W. et al, "Fundamentals of Power Electronics," Second Edition, Chapter 6, Boulder, CO, 2001.

F. T. Wakabayashi et al., An Improved Design Procedure for LCC Resonant Filter of Dimmable Electronic Ballasts for Fluorescent Lamps, Based on Lamp Model, IEEE Transactions on Power Electronics, vol. 20, No. 2, Sep. 2005.

F. Tao et al., "Single-Stage Power-Factor-Correction Electronic Ballast with a Wide Continuous Dimming Control for Fluorescent Lamps," IEEE Power Electronics Specialists Conference, vol. 2, 2001.

Fairchild Semiconductor, Application Note 42030, Theory and Application of the ML4821 Average Current Mode PFC Controller, Oct. 25, 2000.

Fairchild Semiconductor, Application Note 42030, Theory and Application of the ML4821 Average Current Mode PFC Controller, Aug. 1997.

Fairchild Semiconductor, Application Note 42047 Power Factor Correction (PFC) Basics, Rev. 0.9.0 Aug. 19, 2004.

Fairchild Semiconductor, Application Note 6004, 500W Power-Factor-Corrected (PFC) Converter Design with FAN4810, Rev. 1.0.1, Oct. 31, 2003.

Fairchild Semiconductor, Application Note AN4121, Design of Power Factor Correction Circuit Using FAN7527B, Rev.1.0.1, May 30, 2002.

Fairchild Semiconductor, FAN4800, Low Start-up Current PFC/PWM Controller Combos, Nov. 2006.

Fairchild Semiconductor, FAN4810, Power Factor Correction Controller, Sep. 24, 2003.

Fairchild Semiconductor, FAN4822, ZVA Average Current PFC Controller, Rev. 1.0.1 Aug. 10, 2001.

Fairchild Semiconductor, FAN7527B, Power Factor Correction Controller, 2003.

Fairchild Semiconductor, FAN7532, Ballast Controller, Rev. 1.0.2, Jun. 2006.

Fairchild Semiconductor, FAN7544, Simple Ballast Controller, Rev. 1.0.0, 2004.

Fairchild Semiconductor, FAN7711, Ballast Control IC, Rev. 1.0.2, Mar. 2007.
Fairchild Semiconductor, KA7541, Simple Ballast Controller, Rev. 1.0.3, 2001.
Fairchild Semiconductor, ML4812, Power Factor Controller, Rev. 1.0.4, May 31, 2001.
Fairchild Semiconductor, ML4821, Power Factor Controller, Rev. 1.0.2, Jun. 19, 2001.
Feng, et al. "Ultra Fast Fixed-Frequency Hysteretic Buck Converter With Maximum Charging Current Control and Adaptive Delay Compensation for DVS Applications", IEEE JSSC, IEEE Press, New Jersey, Nov. 2001.
Freescale Semiconductor, AN1965, Design of Indirect Power Factor Correction Using 56F800/E, Jul. 2005.
Freescale Semiconductor, AN3052, Implementing PFC Average Current Mode Control Using the MC9S12E128, Nov. 2005.
Freescale Semiconductor, Inc., Dimmable Light Ballast with Power Factor Correction, Design Reference Manual, DRM067, Rev. 1, Dec. 2005.
G. Yao et al., Soft Switching Circuit for Interleaved Boost Converters, IEEE Transactions on Power Electronics, vol. 22, No. 1, Jan. 2007.
Gu, et al, "Three-Level LLC Series Resonant DC/DC Converter," IEEE Transactions on Power Electronics, vol. 20, No. 4, p. 781-789, Jul. 2005.
H. L. Cheng et al., A Novel Single-Stage High-Power-Factor Electronic Ballast with Symmetrical Topology, IEEE Transactions on Power Electronics, vol. 50, No. 4, Aug. 2003.
H. Peng et al., Modeling of Quantization Effects in Digitally Controlled DC-DC Converters, IEEE Transactions on Power Electronics, vol. 22, No. 1, Jan. 2007.
H. Wu et al., Single Phase Three-Level Power Factor Correction Circuit with Passive Lossless Snubber, IEEE Transactions on Power Electronics, vol. 17, No. 2, Mar. 2006.
Hirota, Atsushi et al, "Analysis of Single Switch Delta-Sigma Modulated Pulse Space Modulation PFC Converter Effectively Using Switching Power Device," IEEE, US, 2002.
Infineon, CCM-PFC Standalone Power Factor Correction (PFC) Controller in Continuous Conduction Mode (CCM), Version 2.1, Feb. 6, 2007.
International Rectifier, Application Note AN-1077,PFC Converter Design with IR1150 One Cycle Control IC, rev. 2.3, Jun. 2005.
International Rectifier, Data Sheet No. PD60230 revC, IR1150(S)(PbF), uPFC One Cycle Control PFC IC Feb. 5, 2007.
International Rectifier, Data Sheet PD60230 revC, Feb. 5, 2007.
International Rectifier, IRAC1150-300W Demo Board, User's Guide, Rev 3.0, Aug. 2, 2005.
Intersil, "Designing with the ISL6752, ISL6753 ZVS Full-Bridge Controllers," Application Note AN1262.0, Aug. 15, 2006.
J. A. Vilela Jr. et al., An Electronic Ballast with High Power Factor and Low Voltage Stress, IEEE Transactions on Industry Applications, vol. 41, No. 4, Jul./Aug. 2005.
J. Qian et al., Charge Pump Power-Factor-Correction Technologies Part II: Ballast Applications, IEEE Transactions on Power Electronics, vol. 15, No. 1, Jan. 2000.
J. Qian et al., New Charge Pump Power-Factor-Correction Electronic Ballast with a Wide Range of Line Input Voltage, IEEE Transactions on Power Electronics, vol. 14, No. 1, Jan. 1999.
J. Turchi, Four Key Steps to Design a Continuous Conduction Mode PFC Stage Using the NCP1653, ON Semiconductor, Publication Order No. AND184/D, Nov. 2004.
J. Zhou et al., Novel Sampling Algorithm for DSP Controlled 2 kW PFC Converter, IEEE Transactions on Power Electronics, vol. 16, No. 2, Mar. 2001.
J.W.F. Dorleijn et al., Standardisation of the Static Resistances of Fluorescent Lamp Cathodes and New Data for Preheating, Industry Applications Conference, vol. 1, Oct. 13, 2002-Oct. 18, 2002.
K. Leung et al., "Dynamic Hysteresis Band Control of the Buck Converter with Fast Transient Response," IEEE Transactions on Circuits and Systems—II: Express Briefs, vol. 52, No. 7, Jul. 2005.
K. Leung et al., "Use of State Trajectory Prediction in Hysteresis Control for Achieving Fast Transient Response of the Buck Converter," Circuits and Systems, 2003. ISCAS apos;O3. Proceedings of the 2003 International Symposium, vol. 3, Issue , May 25-28, 2003 pp. III-439-III-442 vol. 3.
K.M. Smedley, One-Cycle Control of Switching Converters, IEEE Transactions on Power Electronics, vol. 10, No. 6, Nov. 1995.
L. Balogh et al., Power-Factor Correction with Interleaved Boost Converters in Continuous-Inductor-Current Mode, Eighth Annual Applied Power Electronics Conference and Exposition, 1993. APEC '93. Conference Proceedings, Mar. 7, 1993-Mar. 11, 1993.
L. Gonthier et al., EN55015 Compliant 500W Dimmer with Low-Losses Symmetrical Switches, 2005 European Conference on Power Electronics and Applications, Sep. 2005.
Light Dimmer Circuits, www.epanorama.net/documents/lights/lightdimmer.html, printed Mar. 26, 2007.
Light Emitting Diode, http://en.wikipedia.org/wiki/Light-emitting_diode, printed Mar. 27, 2007.
Linear Technology, "Single Switch PWM Controller with Auxiliary Boost Converter," LT1950 Datasheet, Linear Technology, Inc., Milpitas, CA, 2003.
Linear Technology LTC3705 Datasheet, 2005 Linear Technology, Inc.
Linear Technology, 100 Watt LED Driver, Linear Technology, 2006.
Linear Technology, LT1248, Power Factor Controller, Apr. 20, 2007.
Linear Technology, News Release, Triple Output LED, LT3496, Linear Technology, Milpitas, CA, May 24, 2007.
Linear Technology,"2-Switch Forward Controller and Gate Driver," LTC3705 Datasheet, Linear Technology, Inc., Milpitas, CA, 2005.
Lu et al., International Rectifier, Bridgeless PFC Implementation Using One Cycle Control Technique, 2005.
Lu, et al, "Quasi Current Mode Control for the Phase-Shifted Series Resonant Converter," IEEE Transactions on Power Electronics, vol. 23, No. 1, p. 353-358, Jan. 2008.
M. Brkovic et al., "Automatic Current Shaper with Fast Output Regulation and Soft-Switching," S.15.C Power Converters, Telecommunications Energy Conference, 1993.
M. K. Kazimierczuk et al., Electronic Ballast for Fluorescent Lamps, IEEETransactions on Power Electronics, vol. 8, No. 4, Oct. 1993.
M. Madigan et al., Integrated High-Quality Rectifier-Regulators, IEEE Transactions on Industrial Electronics, vol. 46, No. 4, Aug. 1999.
M. Ponce et al., High-Efficient Integrated Electronic Ballast for Compact Fluorescent Lamps, IEEE Transactions on Power Electronics, vol. 21, No. 2, Mar. 2006.
M. Radecker et al., Application of Single-Transistor Smart-Power IC for Fluorescent Lamp Ballast, Thirty-Fourth Annual Industry Applications Conference IEEE, vol. 1, Oct. 3, 1999-Oct. 7, 1999.
M. Rico-Secades et al., Low Cost Electronic Ballast for a 36-W Fluorescent Lamp Based on a Current-Mode-Controlled Boost Inverter for a 120-V DC Bus Power Distribution, IEEE Transactions on Power Electronics, vol. 21, No. 4, Jul. 2006.
Mammano, B., Resonant Mode Converter Topologies, Texas Instruments, 2001.
Megaman, D or S Dimming ESL, Product News, Mar. 15, 2007.
National Lighting Product Information Program, Specifier Reports, "Dimming Electronic Ballasts," vol. 7, No. 3, Oct. 1999.
Noon, Jim "UC3855A/B High Performance Power Factor Preregulator", Texas Instruments, SLUA146A, May 1996, Revised Apr. 2004.
NXP, TEA1750, GreenChip III SMPS control IC Product Data Sheet, Apr. 6, 2007.
O. Garcia et al., High Efficiency PFC Converter to Meet EN61000-3-2 and A14, Proceedings of the 2002 IEEE International Symposium on Industrial Electronics, vol. 3, 2002.
ON Semconductor, NCP1606, Cost Effective Power Factor Controller, Mar. 2007.
ON Semiconductor, AND8123/D, Power Factor Correction Stages Operating in Critical Conduction Mode, Sep. 2003.
ON Semiconductor, MC33260, GreenLine Compact Power Factor Controller: Innovative Circuit for Cost Effective Solutions, Sep. 2005.
ON Semiconductor, NCP1605, Enhanced, High Voltage and Efficient Standby Mode, Power Factor Controller, Feb. 2007.

ON Semiconductor, NCP1654, Product Review, Power Factor Controller for Compact and Robust, Continuous Conduction Mode Pre-Converters, Mar. 2007.

P. Green, A Ballast that can be Dimmed from a Domestic (Phase-Cut) Dimmer, IRPLCFL3 rev. b, International Rectifier, http://www.irf.com/technical-info/refdesigns/cfl-3.pdf, printed Mar. 24, 2007.

P. Lee et al., Steady-State Analysis of an Interleaved Boost Converter with Coupled Inductors, IEEE Transactions on Industrial Electronics, vol. 47, No. 4, Aug. 2000.

Philips, Application Note, 90W Resonant SMPS with TEA1610 SwingChip, AN99011, 1999.

Power Integrations, Inc., "TOP200-4/14 TOPSwitch Family Three-terminal Off-line PWM Switch", XP-002524650, Jul. 1996, Sunnyvale, California.

Power Supply Design Tutorial, SMPS Block Diagram, Basic Concepts, Theory of Operation, http://www.smps.us/power-supply.html, printed Aug. 11,2008.

Prodic, A. et al, "Dead Zone Digital Controller for Improved Dynamic Response of Power Factor Preregulators," IEEE, 2003.

Prodic, Aleksandar, "Digital Controller for High-Frequency Rectifiers with Power Factor Correction Suitable for On-Chip Implementation," IEEE, US, 2007.

Q. Li et al., An Analysis of the ZVS Two-Inductor Boost Converter under Variable Frequency Operation, IEEE Transactions on Power Electronics, vol. 22, No. 1, Jan. 2007.

Renesas Technology Releases Industry's First Critical-Conduction-Mode Power Factor Correction Control IC Implementing Interleaved Operation, Dec. 18, 2006.

Renesas, Application Note R2A20111 EVB, PFC Control IC R2A20111 Evaluation Board, Feb. 2007.

Renesas, HA16174P/FP, Power Factor Correction Controller IC, Jan. 6, 2006.

S. Ben-Yaakov et al., Statics and Dynamics of Fluorescent Lamps Operating at High Frequency: Modeling and Simulation, IEEE Transactions on Industry Applications, vol. 38, No. 6, Nov.-Dec. 2002.

S. Chan et al., Design and Implementation of Dimmable Electronic Ballast Based on Integrated Inductor, IEEE Transactions on Power Electronics, vol. 22, No. 1, Jan. 2007.

S. Dunlap et al., Design of Delta-Sigma Modulated Switching Power Supply, Circuits & Systems, Proceedings of the 1998 IEEE International Symposium, 1998.

S. Lee et al., A Novel Electrode Power Profiler for Dimmable Ballasts Using DC Link Voltage and Switching Frequency Controls, IEEE Transactions on Power Electronics, vol. 19, No. 3, May 2004.

S. Lee et al., TRIAC Dimmable Ballast with Power Equalization, IEEE Transactions on Power Electronics, vol. 20, No. 6, Nov. 2005.

S. Skogstad et al., A Proposed Stability Characterization and Verification Method for High-Order Single-Bit Delta-Sigma Modulators, Norchip Conference, Nov. 2006 http://folk.uio.no/savskogs/pub/A_Proposed_Stability_Characterization. pdf.

S. T.S. Lee et al., Use of Saturable Inductor to Improve the Dimming Characteristics of Frequency-Controlled Dimmable Electronic Ballasts, IEEE Transactions on Power Electronics, vol. 19, No. 6, Nov. 2004.

S. Zhou et al., "A High Efficiency, Soft Switching DC-DC Converter with Adaptive Current-Ripple Control for Portable Applications," IEEE Transactions on Circuits and Systems—II: Express Briefs, vol. 53, No. 4, Apr. 2006.

Spiazzi G et al: "Analysis of a High-Power Factor Electronic Ballast for High Brightness Light Emitting Diodes" Power Electronics Specialists, 2005 IEEE 36th Conference on Jun. 12, 2005, Piscatawa, NJ, USA, IEEE, Jun. 12, 2005, pp. 1494-1499.

ST Microelectronics, AN993, Application Note, Electronic Ballast with PFC Using L6574 and L6561, May 2004.

ST Microelectronics, L6574, CFL/TL Ballast Driver Preheat and Dimming, Sep. 2003.

ST Microelectronics, Power Factor Corrector L6561, Jun. 2004.

STMicroelectronics, L6563, Advanced Transition-Mode PFC Controller, Mar. 2007.

Supertex Inc., 56W Off-line LED Driver, 120VAC with PFC, 160V, 350mA Load, Dimmer Switch Compatible, DN-H05, Feb. 2007.

Supertex Inc., Buck-based LED Drivers Using the HV9910B, Application Note AN-H48, Dec. 28, 2007.

Supertex Inc., HV9931 Unity Power Factor LED Lamp Driver, Application Note AN-H52, Mar. 7, 2007.

T. Wu et al., Single-Stage Electronic Ballast with Dimming Feature and Unity Power Factor, IEEE Transactions on Power Electronics, vol. 13, No. 3, May 1998.

Texas Instruments, "BiCMOS Advanced Phase-Shift PWM Controller Datasheet," UCC1895, UCC2895, UCC3895, Dec. 1999, Rev. Apr. 2008.

Texas Instruments, Application Note SLUA321, Startup Current Transient of the Leading Edge Triggered PFC Controllers, Jul. 2004.

Texas Instruments, Application Report SLUA308, UCC3817 Current Sense Transformer Evaluation, Feb. 2004.

Texas Instruments, Application Report SLUA369B, 350-W, Two-Phase Interleaved PFC Pre-Regulator Design Review, Mar. 2007.

Texas Instruments, Application Report SPRA902A, Average Current Mode Controlled Power Factor Correctiom Converter using TMS320LF2407A, Jul. 2005.

Texas Instruments, Application Report, SLUA309A, Avoiding Audible Noise at Light Loads when using Leading Edge Triggered PFC Converters, Sep. 2004.

Texas Instruments, SLOS318F, "High-Speed, Low Noise, Fully-Differential I/O Amplifiers," THS4130 and THS4131, US, Jan. 2006.

Texas Instruments, SLUS828B, "8-Pin Continuous Conduction Mode (CCM) PFC Controller", UCC28019A, US, revised Apr. 2009.

Texas Instruments, Transition Mode PFC Controller, SLUS515D, Jul. 2005.

Texas Instruments, UCC3817 BiCMOS Power Factor Preregulator Evaluation Board User's Guide, Nov. 2002.

Unitrode Products From Texas Instruments, BiCMOS Power Factor Preregulator, Feb. 2006.

Unitrode Products From Texas Instruments, High Performance Power Factor Preregulator, Oct. 2005.

Unitrode Products From Texas Instruments, Programmable Output Power Factor Preregulator, Dec. 2004.

Unitrode, Design Note DN-39E, Optimizing Performance in UC3854 Power Factor Correction Applications, Nov. 1994.

Unitrode, High Power-Factor Preregulator, Oct. 1994.

Unitrode, L. Balogh, Design Note UC3854A/B and UC3855A/B Provide Power Limiting with Sinusoidal Input Current for PFC Front Ends, SLUA196A, Nov. 2001.

V. Nguyen et al., "Tracking Control of Buck Converter Using Sliding-Mode with Adaptive Hysteresis," Power Electronics Specialists Conference, 1995. PESC apos; 95 Record., 26th Annual IEEE vol. 2, Issue , Jun. 18-22, 1995 pp. 1086-1093.

W. Zhang et al., A New Duty Cycle Control Strategy for Power Factor Correction and FPGA Implementation, IEEE Transactions on Power Electronics, vol. 21, No. 6, Nov. 2006.

Why Different Dimming Ranges? The Difference Between Measured and Perceived Light, 2000 http://www.lutron.com/ballast/pdf/LutronBallastpg3.pdf.

Wong, et al., "Steady-state Analysis of Hysteretic Control Buck Converters", Power Electronics and Motion Control Conference, IEEE Press, New Jersey, Sep. 2008.

Y. Ji et al., Compatibility Testing of Fluorescent Lamp and Ballast Systems, IEEE Transactions on Industry Applications, vol. 35, No. 6, Nov./Dec. 1999.

Y. Ohno, Spectral Design Considerations for White LED Color Rendering, Final Manuscript, Optical Engineering, vol. 44, 111302 (2005).

Z. Lai et al., A Family of Power-Factor-Correction Controllers, Twelfth Annual Applied Power Electronics Conference and Exposition, vol. 1, Feb. 23, 1997-Feb. 27, 1997.

Zhao, et al. "Steady-state and Dynamic Analysis of a Buck Converter Using a Hysteretic PWM Control", Power Electronics Specialists Conference, IEEE Press, New Jersey, Jun. 2004.

* cited by examiner

AUDIBLE NOISE SUPPRESSION IN A RESONANT SWITCHING POWER CONVERTER

This application Claims priority under 35 U.S.C. §119(e) to U.S. Provisional Patent Application Ser. No. 61/083,717 filed on Jul. 25, 2008.

CROSS-REFERENCE TO RELATED APPLICATION

The present U.S. patent application is related to U.S. patent application Ser. No. 12/242,199 entitled "RESONANT SWITCHING POWER CONVERTER WITH BURST MODE TRANSITION SHAPING", filed contemporaneously herewith by the same inventor and assigned to the same Assignee. The disclosure of the above-referenced U.S. patent application is incorporated herein by reference.

BACKGROUND OF THE INVENTION

1. Field of the Invention

The present invention relates generally to switching power regulator circuits, and more specifically, to a resonant switching power converter in which burst mode pulse patterns are varied between bursts.

2. Background of the Invention

In resonant switching power converters, as output current demand falls, the switching frequency is raised to reduce the power output. However, when low or zero-load conditions are encountered, the required switching frequency may become impractical and will typically cause a dramatic drop in efficiency due to increases in switching losses in conjunction with the relative drop in output power vs. the power consumed in ordinary switching operation. For the above reasons, a low-power "burst" mode is typically employed in low or zero output current demand periods, during which the output voltage is maintained by issuing a burst of pulses to restart oscillation of the resonant circuit at a level sufficient to re-charge the output capacitor of the resonant switching power converter. Between the bursts, the output capacitor supplies power to the load.

However, typical burst operation causes audible noise due to the bursts being infrequent enough to fall into the audible range. Due to magneto-restrictive behavior, cores of inductors and transformers will cause audible vibrations due to the transients generated by the bursts.

Therefore, it would be desirable to provide a resonant switching power converter with a low-power operating mode having reduced audible vibration.

SUMMARY OF THE INVENTION

The above stated objectives of providing a low-power operating mode for a resonant switching power converter having reduced audible vibration is achieved in a resonant switching power converter and its method of operation.

The resonant switching power converter includes a resonant tank circuit, a switching circuit for transferring energy to the resonant tank circuit from an input voltage source, and a transformer for coupling the resonant tank circuit to an output of the switching power converter. In a low-power mode of operation, the switching circuit issues burst of pulses with a varying pattern or duration between the bursts, which spreads the audible noise across the audio spectrum, reducing the energy of peaks in the audio spectrum, and lowering the perceived psycho-acoustical loudness of the noise.

If the pattern of pulses within the bursts are varied, the variation may be by number of pulses, polarity of the initial pulse. Alternatively or in combination, pulse durations may be varied uniformly within a burst, randomly within a burst or by selecting from among a number of set patterns according to tables stored in a memory.

The foregoing and other objectives, features, and advantages of the invention will be apparent from the following, more particular, description of the preferred embodiment of the invention, as illustrated in the accompanying drawings.

DESCRIPTION OF ILLUSTRATIVE EMBODIMENT

The present invention encompasses circuits and methods for reducing audible vibration in inductors and output transformers of resonant switching power converters operating in low power burst mode. Variations in the burst and/or pulse structure are made between bursts to widen the audio frequency spectrum of transients that cause the audible vibration.

Figure 1:
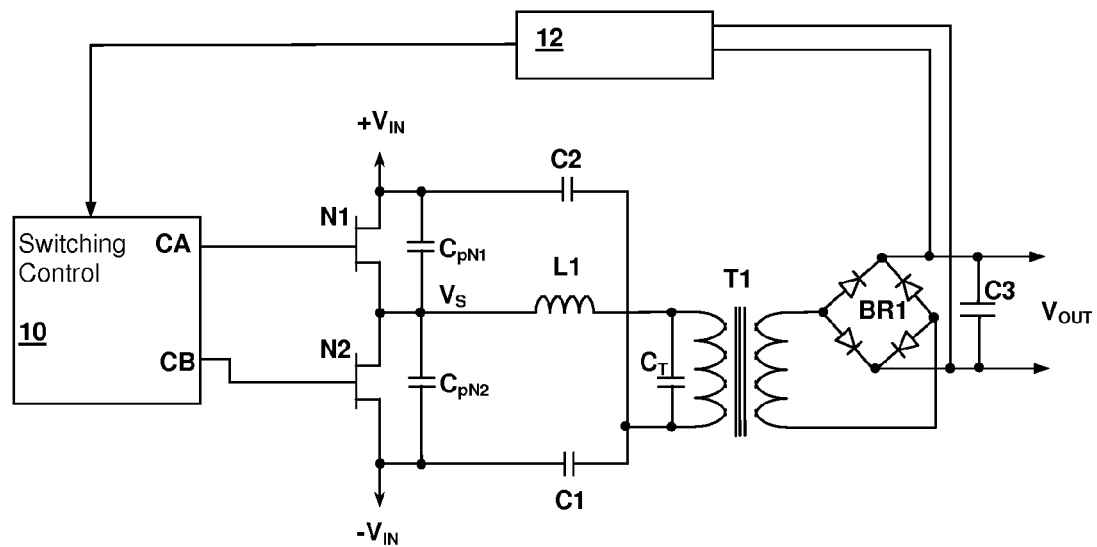
FIG. 1 is a simplified schematic diagram depicting a resonant switching power converter in accordance with an embodiment of the present invention.

Referring now to FIG. 1, a resonant switching power converter circuit in accordance with an embodiment of the present invention is shown. A switching control circuit 10 controls a switching circuit implemented by transistors N1 and N2. A series-resonant tank circuit formed by an inductance and a capacitance and is energized by the switching action of transistors N1 and N2. A transformer T1 couples energy from the resonance tank circuit to a rectifier bridge BR1 which provides rectified current for charging output capacitor C3. Output voltage $V_{OUT}$ may be maintained at a predetermined voltage during burst mode by a feedback circuit 12 that provides a feedback signal to switching control circuit 10. Alternatively, the burst mode may be "free-wheeling", such that bursts sufficient to supply load current low enough to trigger burst mode operation may be predetermined and supplied without feedback control. Switching control circuit 10 includes logic and/or algorithms to generate the bursts with variations between burst cycles to widen the audio spectrum of the transients generated by the operation of transistors N1 and N2 in charging the resonant tank circuit.

In FIG. 1, the inductance of the resonant tank circuit is illustrated as an inductor L1 plus any leakage inductance of the primary winding of transformer T1. However, it is understood that the inductance of the resonant tank circuit may be entirely supplied by the leakage inductance of transformer T1 and therefore inductor L1 will not be present in some embodiments of the invention. The capacitance of the resonant tank circuit is supplied by the total series capacitance of the tank, which as illustrated includes the parallel combination of capacitors C1 and C2, the parasitic winding capacitance $C_T$ in parallel with any reflected capacitance at the primary winding of transformer T1, and when neither transistor N1 nor N2 is active, the parallel combination of the parasitic capacitances ($C_{pN1}$ and $C_{pN2}$) of transistors N1 and N2.

Under low load or open-circuit conditions, switching control circuit 10 operates in a burst mode, in order to maintain efficiency of the resonant switching power converter circuit under such conditions. Since the switching frequency generated by switching control circuit 10 is generally very high and is raised away from the resonant frequency of the series-resonant tank circuit as the load current decreases, losses due to operating switching transistors N1 and N2 are generally also high and increase with decreasing load. Therefore, to maintain output voltage $V_{OUT}$ at the desired level, it is more efficient to detect droop in output voltage $V_{OUT}$ and generate a burst of pulses from switching control circuit 10 that energizes the resonant tank to charge output capacitor C3 by an amount sufficient to ensure that the time between bursts will be quite long. Alternatively, as mentioned above, the bursts may be generated at predetermined intervals according to the minimum burst size and burst interval required to supply current at a specified minimum value of output voltage $V_{OUT}$ to a load.

Figure 2:
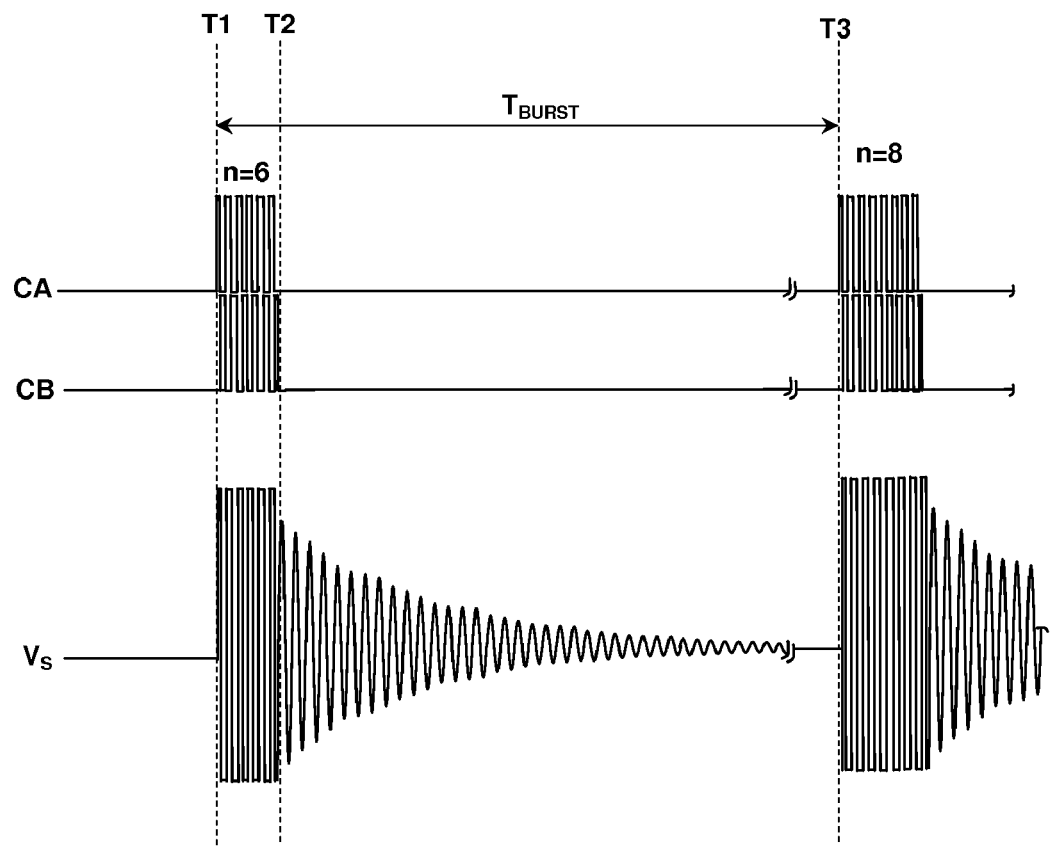
FIG. 2 is a timing diagram depicting burst mode operation of the switching power converter of FIG. 1, in accordance with an embodiment of the present invention.

Referring now to FIG. 2, burst mode operation of the resonant switching power converter circuit of FIG. 1 is illustrated in a timing diagram, in accordance with an embodiment of the invention. At time T1, a burst commences and includes six positive pulses and six negative pulses. Control signal CA controls transistor N1 to generate the positive pulses observed in voltage $V_S$, which is supplied by the switching circuit (e.g., transistors N1 and N2 in FIG. 1) to the resonant tank circuit. Control signal CB controls transistor N2 to generate the negative pulses observed in voltage $V_S$. As illustrated, the pulses are not of uniform duration, which is not a requirement of the present invention, but provides advantages in reducing the overall transient energy as described in the above-incorporated U.S. patent application "RESONANT SWITCHING POWER CONVERTER WITH BURST MODE TRANSITION SHAPING." The first two and last two pulses of the bursts are truncated to one-half of the duration of the durations of the remainder of the pulses, which will be described in further detail below. At time T2, the first burst ends and voltage $V_S$ is no longer forced to the input voltage levels by transistors N1 and N2, but is generated by the "ringing" of the resonant tank circuit.

In order to broaden the audio spectrum generated by the bursts, which lowers the energy of the audible vibration at specific frequencies, thereby reducing the psychoacoustic perception of loudness, switching control 10 can use one of several techniques. Two possible techniques are illustrated in FIG. 2, and can be applied individually, or in combination. The first technique is to vary the value of the time interval between time T1 and T3, which is burst repetition period $T_{BURST}$, which is equivalently performed by varying the time between bursts (time T3-time T2). The results is that the pulses within the bursts are not modified, but the basic repetition rate of the bursts is varied, which is the dominant factor in setting the fundamental frequency heard in the audible range. The second technique that is illustrated, is to vary the number of pulses n within the bursts. In FIG. 2, the first burst has n=6 pulses and the second burst has n=8. Changing the number of pulses will affect the line width of the spectrum and varying the number of pulses spreads the lines in the spectrum, producing the desired effect of spreading the energy in the audible frequency range.

Figure 3:
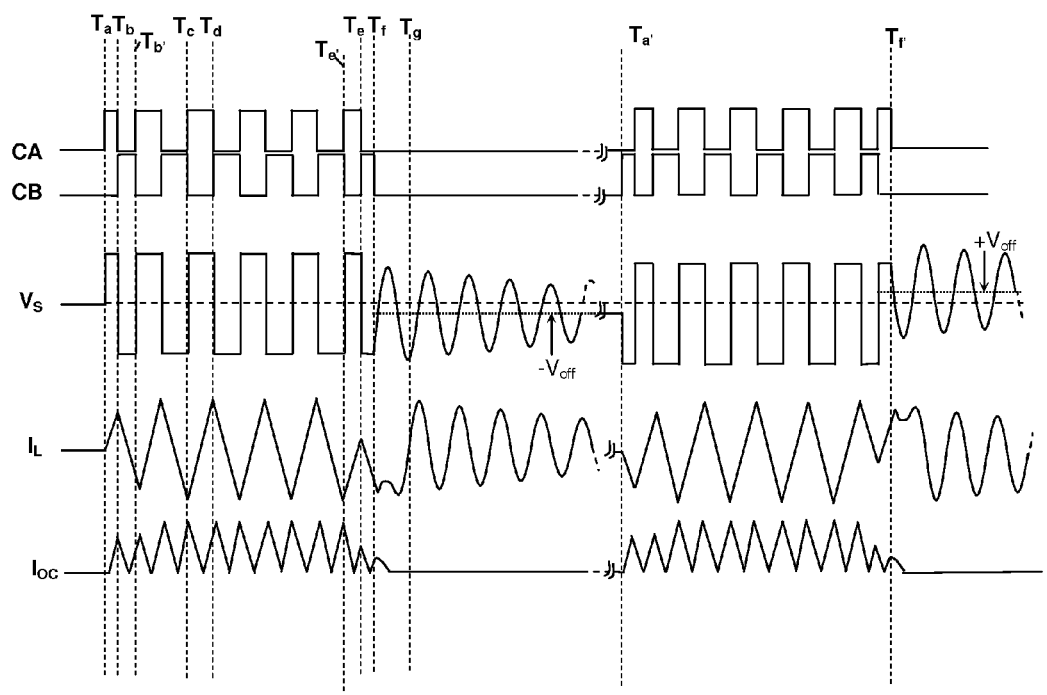
FIG. 3 is a timing diagram depicting details of burst mode operation of the switching power converter of FIG. 1, in accordance with another embodiment of the present invention.

Referring now to FIG. 3, details of burst mode operation of the resonant switching power converter of the present invention are further illustrated in accordance with another embodiment of the present invention. In the illustrated embodiment, the initial pulse polarity is varied between bursts, which changes the audible spectrum of the transient energy, and is the only such technique illustrated in FIG. 3, as the bursts are otherwise identical in repetition rate and pulse pattern. Two pulses are shortened with respect to the nominal pulse duration (time $T_d$-time $T_C$) of the pulses in the middle of the burst as mentioned above. Shortening two or more pulses provides two benefits: 1) the transient behavior at the beginning and end of the burst is relaxed; and 2) efficiency can be further improved and switching transients reduced by changing the quiescent value of voltage $V_S$ at the end of the "ringing" of the resonant tank circuit in the direction of the switching event commencing the next pulse burst. To obtain the second benefit, the polarity of the first pulse (and last pulse) of each burst is alternated as shown in the figure, which can be performed by swapping the control patterns of control signals CA and CB between each burst as illustrated.

Inductor current $I_L$ through inductor L1 (or the current through whatever inductance provides the series inductance for the resonant tank circuit) rises to a peak value at time $T_b$. Subsequently, negative pulses generated by the action of control signal CB and positive pulses generated by the action of control signal CA, continue to produce substantially equal and opposite polarity peaks in inductor current $I_L$, and have a duration longer than the starting pulses, as illustrated by the duration between time $T_C$ and time $T_d$. If the first pulse of the burst were generated with a full nominal pulse duration (i.e., the same duration as the durations of the pulses in the middle of the burst), the first peak in inductor current $I_L$ would be twice the peak value in the Figure, generating a transient that will cause stress in switching transistors N1 and N2, as well as transformer T1 and the other components in series with the primary winding of transformer T1 and audible noise in transformer T1 and inductor L1 due to magneto-restriction. The resulting transient would also cause faster charging of output capacitor C3, due to larger peaks in output capacitor charging current $I_{OC}$, causing increased stress in capacitor C3 and bridge rectifier BR1.

Between time $T_b$ and time $T_{b'}$ a second pulse of the burst is generated with a duration that differs from both the commencing half-duration pulse at the beginning of the burst and the full duration pulses in the middle of the burst (e.g., ¾ duration), and similarly between time $T_e$ and time $T_{e'}$ a pulse of opposite polarity and equal duration is provided to maintain net-zero average inductor current $I_L$. However, while the inductor current is maintained at a net-zero level, voltage $V_S$ is not maintained at a zero nominal level as between the bursts. At the end of the first burst at time $T_f$ an offset voltage $-V_{off}$ remains on the output of the switching circuit (e.g., on the common connection of parasitic capacitances $C_{pN1}$ and $C_{pN2}$ of transistors N1 and N2 in FIG. 1. By alternating the polarity of the bursts (by swapping control patterns of control signals CA and CB), the pulse beginning the next burst at time $T_a'$ has a polarity equal to the polarity of the ending pulse of the last burst, and the voltage change that the switching circuit must produce is thereby reduced by the value of offset voltage $V_{off}$, which reduces stress in switching transistors N1 and N2 as well as reducing line transients. At the end of the second burst at time $T_f'$ a voltage $+V_{off}$ remains in the quiescent value of voltage $V_S$, which will match the polarity of the positive pulse to be generated at the start of the next burst.

By starting reduced duration pulses, rather than a full duration pulse, the transient current at the beginning of each burst is eliminated. Further, at the end of each burst, shortened duration pulses of opposite polarity (negative in the illustration) are generated between times $T_e$, and $T_f$ to prevent generating similar transients at the end of the bursts and to match the current injected into the resonant tank circuit within an opposite polarity current. At time $T_g$, the ringing action of the resonant tank illustrates the relative phase of ninety (90) degrees between inductor current $I_L$ and voltage $V_S$. An even number of positive and negative pulses (e.g., four full-duration pulses of positive and negative, two shortened duration positive pulses and two shortened duration negative pulses) is enforced to maintain the inductor current $I_L$ at a net zero average value for the burst, so that a zero inductor current starting point yields a zero inductor current endpoint for each burst. The above action ensures that the inductor current $I_L$ is not substantially interrupted by the turn-on and turn-off of transistors N1 and N2 at the beginning and end of the bursts, further reducing transient stress and audible effects.

Figure 4A:
FIGS. 4A-4C are timing diagrams depicting details of burst mode operation within the switching power converter of FIG. 1, in accordance with various embodiments of the present invention.

Referring now to FIG. 4A, a burst mode in the resonant switching circuit of FIG. 1 is shown in accordance with yet another embodiment of the present invention. The burst mode illustrated in FIG. 4A is similar to the burst mode illustrated in FIG. 2 and FIG. 3 and therefore only differences between them will be described below, and only control signals CA and CB are illustrated for clarity. In the burst mode of FIG. 4A, rather than modifying the rate between the bursts or the number of pulses in the bursts as in FIG. 2, the burst duration $T_B$ is varied, illustrated as durations $T_{B1}$ and $T_{B2}$. Since the relative duration of the pulses determines the shape of the inductor current $I_L$ waveform, if the entire burst is scaled with respect to time, the current peaks will be reduced or increased, but the net-zero inductor current performance of the bursts is preserved, along with the residual voltage offset behavior, which can be maintained by preserving the widths of the two initial and terminal pulses of the burst (not shown), or allowed to vary slightly according to the variation of burst duration $T_B$.

Figure 4B:
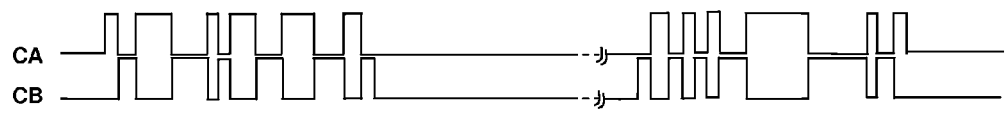

Referring now to FIG. 4B, a burst mode in the resonant switching circuit of FIG. 1 is shown in accordance with still another embodiment of the present invention. The burst mode illustrated in FIG. 4B varies the durations of the pulses within each burst according to a pseudo-random number generator (PRNG). Since inductor current $I_L$ must still be maintained at a net-zero value, each positive pulse is followed by an equal duration negative pulse, which is not a restriction of the present invention, but provides a simple technique for ensuring that random duration variation of the pulses can be applied without destroying the net-zero inductor current $I_L$ balance. As illustrated, the first burst differs substantially from the second burst, causing the audible spectrum generated by the bursts (assuming the random variation continues) to be spread widely in the audio frequency range. In order to preserve the above voltage offset operation in voltage $V_S$ and to avoid generating a large initial transient if the first pulses were randomly set to a long duration, the fixed pulse durations of the first two and last two pulses are maintained, and only the middle pulses of the burst are varied in duration. However, such behavior is not a requirement of the present invention.

Figure 4C:
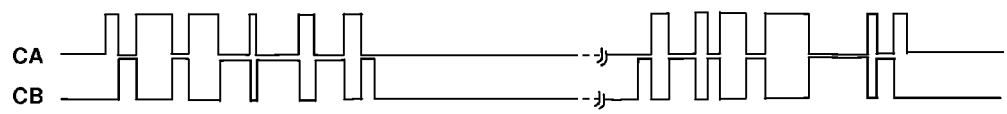

Referring now to FIG. 4C, a burst mode in the resonant switching circuit of FIG. 1 is shown in accordance with another embodiment of the present invention. The burst mode illustrated in FIG. 4C varies the durations of the pulses within each burst according to a predetermined table of pulse width patterns retrieved from storage. Since the patterns are not randomly generated, but are predetermined, each pulse can be of different duration, and a net-zero inductor current $I_L$ balance maintained by pre-computing the durations to yield the net-zero behavior. Likewise, the durations of the initial two pulses and final two pulses can be adjusted for the patterns in order to provide the desired offset value(s) in voltage $V_S$. The patterns may be selected on a cyclic rotation (systematically), or randomly.

Figure 5:
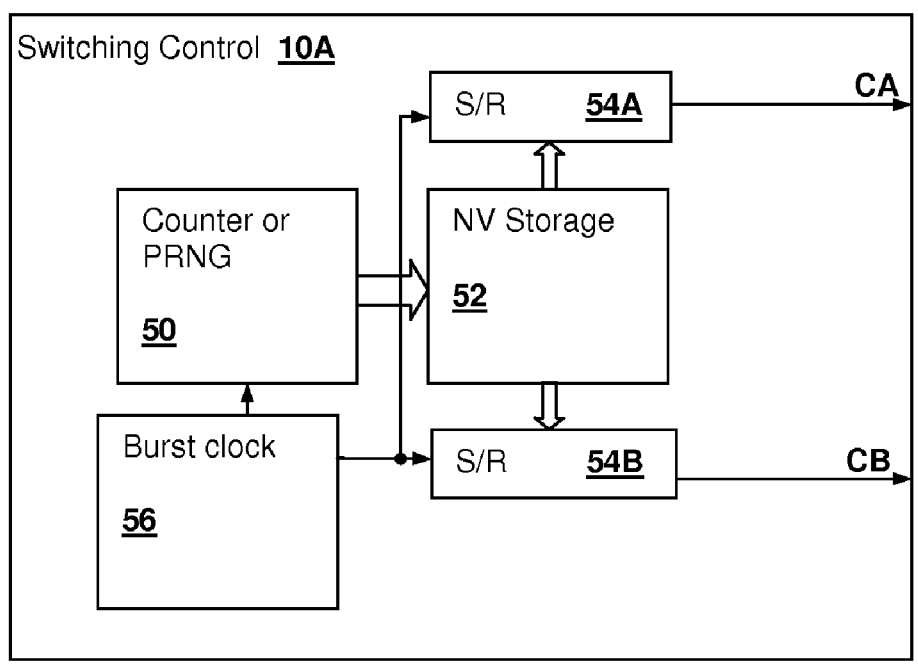
FIG. 5 is a block diagram depicting a control circuit 10A that may be employed within the resonant switching power converter of FIG. 1 in accordance with an alternative embodiment of the present invention.

Referring now to FIG. 5, a switching control circuit 10A in accordance with an embodiment of the present invention that may be used to generate the burst mode operation illustrated in FIG. 4C is shown. A counter or PRNG 50 provides a selection address to a non-volatile (NV) storage 52 that contains the pulse pattern tables. Pairs of pulse patterns are supplied to shift registers 54A and 54B, which are clocked out by burst clock 56 during each burst to generate control signals CA and CB.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A resonant switching power circuit, comprising:
    a resonant circuit including at least one inductance and at least one capacitance for transferring energy to an output of the resonant switching power circuit;
    a switching circuit coupled to the resonant circuit for transferring energy from an input voltage source to the resonant circuit; and
    a control circuit having a burst mode for controlling the switching circuit during low energy demand conditions, in which a number of pulses are generated in intermittent bursts, and wherein the bursts are varied in a manner that reduces the amplitude of peaks in an average audio spectrum of the bursts over that of a burst having a substantially fixed pulse pattern and burst repetition rate.

2. The resonant switching power circuit of claim 1, wherein patterns of the pulses within the bursts are varied to widen the average audio spectrum of the bursts.

3. The resonant switching power circuit of claim 2, wherein at least one beginning or ending pulse of the bursts has a predetermined duration that differs from a period of pulses in a middle of the bursts.

4. The resonant switching power circuit of claim 2, wherein durations of the pulses are varied randomly to widen the average audio spectrum of the bursts.

5. The resonant switching power circuit of claim 2, wherein the patterns of the pulses within the bursts are varied by alternately selecting between multiple sets of predetermined pulse patterns to select a next pattern from one of the predetermined pulse patterns before commencing each burst.

6. The resonant switching power circuit of claim 5, further comprising a storage for storing a look-up table having two or more sets of entries determinative of the multiple sets of predetermined pulse patterns, and wherein the control circuit alternatively selects and reads the sets of entries to generate the bursts according to the selected set of entries.

7. The resonant switching power circuit of claim 2, wherein the patterns of the pulses within the bursts are varied by varying the durations of the pulses within the bursts.

8. The resonant switching power circuit of claim 2, wherein the patterns of the pulses within the bursts are varied by varying number of pulses within the bursts.

9. The resonant switching power circuit of claim 2, wherein the patterns of the pulses within the bursts are varied by changing the polarity of an initial pulse within the bursts.

10. The resonant switching power circuit of claim 1, wherein time intervals between the bursts are varied to widen the average audio spectrum of the bursts.

11. A method of low power operation in a resonant switching power circuit, the method comprising:
    transferring energy to an output of the resonant switching power circuit from a resonant tank circuit;
    transferring energy from an input voltage source to the resonant circuit by operating a switching circuit; and
    operating the switching circuit in a burst mode, in which a number of pulses are generated in bursts to provide the energy to the output of the resonant switching power circuit intermittently when energy demand at the output of the resonant switching power circuit is low, and wherein the bursts are varied in a manner that reduces the amplitude of peaks in an average audio spectrum of the bursts over that of a burst having a substantially fixed pulse pattern and burst repetition rate.

12. The method of claim 11, wherein patterns of the pulses within the bursts are varied to widen the average audio spectrum of the bursts.

13. The method of claim 12, wherein at least one beginning or ending pulse of the bursts has a predetermined duration that differs from a period of pulses in a middle of the bursts.

14. The method of claim 12, wherein durations of the pulses are varied randomly to widen the average audio spectrum of the bursts.

15. The method of claim 12, wherein the patterns of the pulses within the bursts are varied by alternately selecting between multiple sets of predetermined pulse patterns to select a next pattern from one of the predetermined pulse patterns before commencing each burst.

16. The method of claim 15, further comprising reading the next pattern from a storage containing a look-up table having two or more sets of entries determinative of the multiple sets of predetermined pulse patterns, and wherein the selecting alternatively selects and reads the sets of entries from the storage to generate the bursts according to the selected set of entries.

17. The method of claim 12, wherein the patterns of the pulses within the bursts are varied by varying the durations of the pulses within the bursts.

18. The method of claim 12, wherein the patterns of the pulses within the bursts is varied by varying number of pulses within the bursts.

19. The method of claim 12, wherein the patterns of the pulses within the bursts are varied by changing the polarity of an initial pulse within the bursts.

20. The method of claim 11, wherein time intervals between the bursts are varied to widen the average audio spectrum of the bursts.

21. An integrated circuit, comprising a controller for a controlling a resonant switching power converter and that provides control signals to a switching circuit, wherein the controller has a low-power burst mode in which a number of pulses are generated in bursts when energy demand at an output of the resonant switching power converter is low, and wherein the bursts are varied in a manner that reduces the amplitude of peaks in an average audio spectrum of the bursts over that of a burst having a substantially fixed pulse pattern and burst repetition rate.

* * * * *